Oct. 11, 1955     W. L. GROENE     2,720,087
AUTOMOBILE AIR CONDITIONING APPARATUS
Filed Aug. 18, 1953     2 Sheets-Sheet 1

INVENTOR.
Willard S. Groene

Oct. 11, 1955 — W. L. GROENE — 2,720,087
AUTOMOBILE AIR CONDITIONING APPARATUS
Filed Aug. 18, 1953 — 2 Sheets-Sheet 2

INVENTOR.
Willard L. Groene

United States Patent Office 2,720,087
Patented Oct. 11, 1955

2,720,087
AUTOMOBILE AIR CONDITIONING APPARATUS

Willard L. Groene, Phoenix, Ariz.

Application August 18, 1953, Serial No. 375,031

9 Claims. (Cl. 62—4)

This invention pertains to improvements in automobile air conditioning apparatus and is particularly directed to improvements in refrigerating apparatus for motor vehicles such as shown in my co-pending patent application, Serial No. 313,260 filed October 6, 1952.

In recent years there has been a great development in the refrigeration cooling of motor vehicles and in particular automobiles. Certain special problems present themselves in connection with such refrigeration apparatus which is completely foreign and new to the field of refrigeration and brought about by the combination of the peculiar shapes and characteristics of a motor vehicle and the environment in which it must be operated. Certain problems of the speed of the vehicle and weather conditions and the surroundings in which the car is driven present very special and difficult problems to solve. One of these problems is the variation in speed together with the driving of the vehicle in congested areas where the outside air temperature is usually in excess of normal open country road driving. The combination of the slow speed of the vehicle and the excessive heat in crowded congested city areas occurring simultaneously results in a difficult if not impossible problem of properly cooling the vehicle especially when power is derived from the main drive engine of the vehicle.

Therefore one of the objects of this invention is to provide an improved drive mechanism from the main drive motor of the vehicle for properly actuating all of the elements of the refrigeration cooling system so that a constant high degree of cooling efficiency is obtained for the vehicle operating under any speed condition or environment.

Still another object of this invention is to provide an improved automobile air conditioning refrigeration system in which the drive from the main drive engine provides a constant power application to the refrigeration cooling system within a predetermined reduced speed range and idling of the motor vehicle.

Still another object of this invention is to provide an improved drive transmission providing a substantially constant output for the refrigeration compressor and accessory drives for the motor vehicle refrigeration system.

Still another object of this invention is to provide an improved refrigeration cooling system for a motor vehicle having a compressor driven from the main drive motor and in which the compressor is driven at a constant speed for any idling and variation in a predetermined range of slower road speeds of the main drive engine.

Still another object of this invention is to provide an improved drive transmission between the main drive engine and the actuating elements of a refrigeration air conditioning system which provides a constant speed drive from the main drive engine of the vehicle during a predetermined slower range of speed of operation of said engine.

And it is a further object of this invention to provide an improved drive for an automobile refrigeration air conditioning system in which the refrigeration compressor, generator, water pump, and fan, are simultaneously driven at a constant rate of speed from the main drive motor of the vehicle for all idling or various predetermined slower road speed ranges of the main drive engine.

Still another object of this invention is to provide, in an automobile air conditioning system having a main drive engine for propelling the vehicle and accessories for said engine and an air conditioning compressor, an adjustable speed drive from the main engine to the accessories and air conditioning compressor including means for automatically moving the drive unit to slow speed direct drive position independent of main engine speed whenever the engine is being cranked for starting.

It is also contemplated to provide means in connection with an automobile air conditioning system in which the main motor drives the accessories for the main motor and an air conditioning compressor at a constant speed during idling and slow speed operation of the main motor, to provide means for cutting out the drive unit whenever the cooling air fan means for the air conditioner is stopped when no air conditioning is required.

It is also to be provided an arrangement where accessories and the air conditioning compressor of an automobile air conditioner are driven at a constant speed by an adjustable speed unit during idling and slow speed operation of the main engine to provide means for automatically increasing the fuel supply of the carburetor to maintain a constant slow idling speed for the main engine whether or not the air conditioner and drive unit are put into operation.

Further features and advantages of this invention will appear from a detailed description of the drawings in which.

Figure 1:
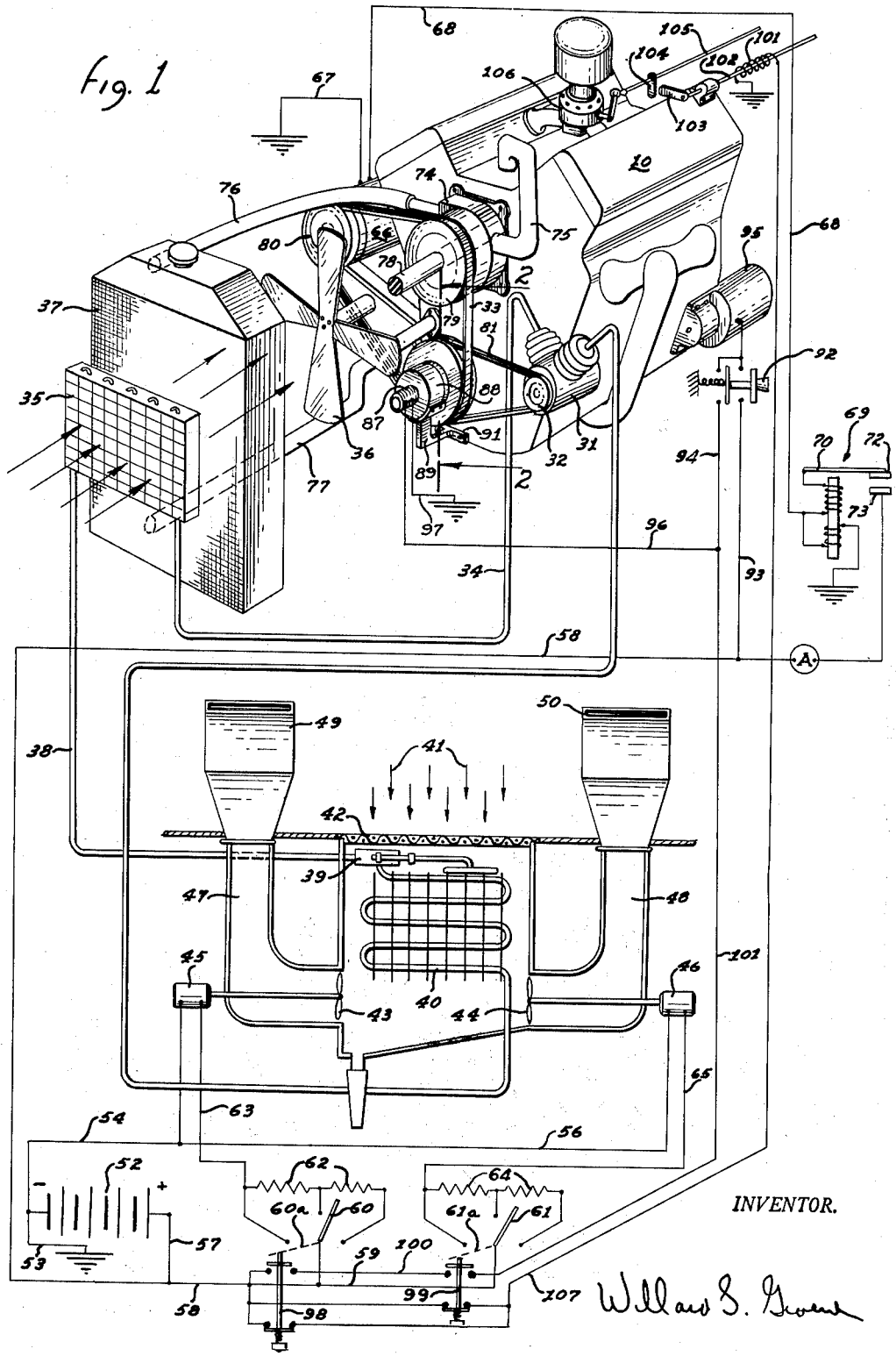
Fig. 1 is a diagrammatic view showing an automobile air conditioning apparatus including the features of this invention.

As exemplary of one embodiment of this invention there is shown a motor vehicle having a main drive engine 10 of the internal combustion type which normally operates at an idling speed and may be regulated to any speed thereabove for propelling the vehicle over the road. The engine 10 has the usual crankshaft 11 upon which is formed the stub end 12 having a keyway 13 formed therein containing a drive key 14. Fixed to the stub end 12 of the crankshaft adjacent the stub end line bearing 15 by a suitable pin 16 and the key 14 is the sheave element 17. An intermediate sheave element 18 is slidably mounted for axial movement on the stub end 12 of the crankshaft but is positively driven by the key 14. A third sheave element 19 is likewise axially slidably mounted on the stub end 12 of the crankshaft but is positively driven by the key 14.

A fly ball governor arrangement is provided for axially shifting the third sheave element 19 on the stub end 12 of the crankshaft 11 and comprises a yoke bushing 20 rigidly fixed to the stub end 12 of the crankshaft by suitable means such as the pin 21. The yoke bushing has a series of bifurcated ears 22 between which are pivotally mounted the counterweight links 23 on pins 24. Fixed integral with the links 23 are the fly balls 25 and the outer ends of the links 23 below the balls 25 are pivotally connected by pins 26 to the outer ends of the links 27 which in turn are connected by pins 28 to the third sheave member 19 so that the rate of rotation of the crankshaft 11 about its axis 29 will cause the fly balls 25 to vary their position in centrifugal force to pull the member 19 to vary the axial position of the member 19 on the shaft 12 in opposition to the tension springs 30 interconnected between the links 27 and the yoke bushing 20. With increased speed of the crankshaft 11 the member 19 will be moved axially to the left in Fig. 2 by the fly balls 25 whereas decreased speed will cause the member 19 to be moved to the right axially of the crankshaft 11 by the springs 30.

Figure 2:
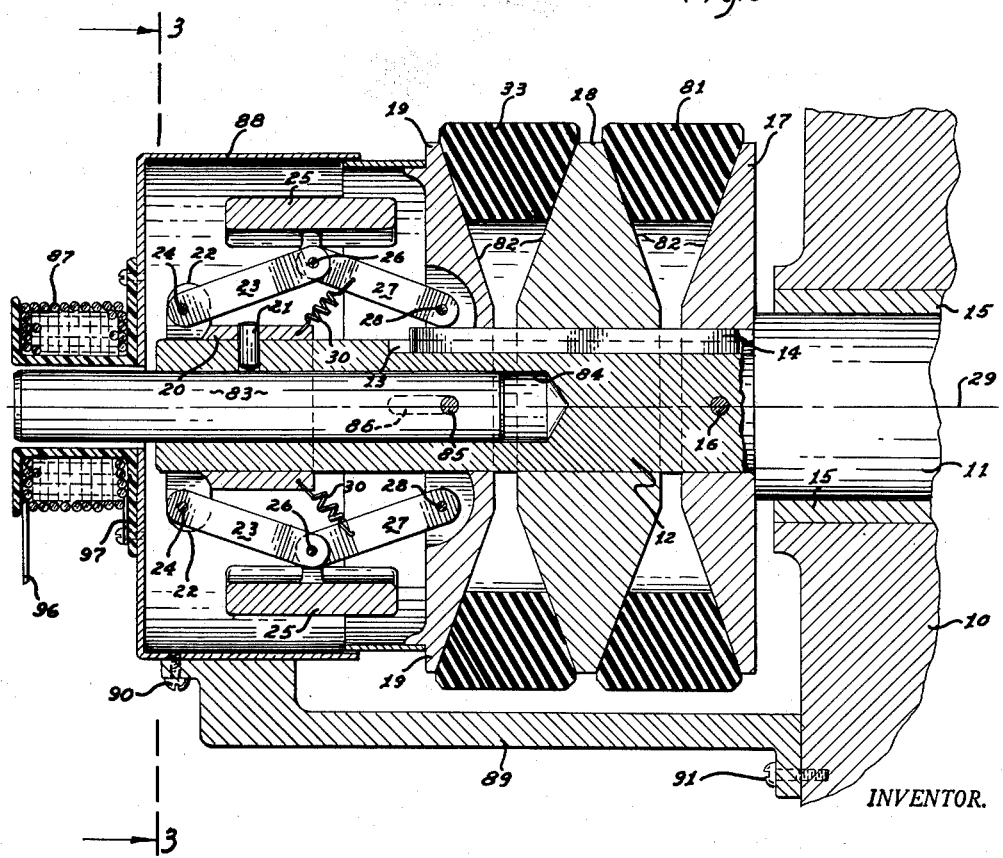
Fig. 2 is an enlarged section of the constant speed control unit on the line 2—2 of Fig. 1.

The refrigeration for the vehicle is provided by a compressor 31 having a driven pulley 32 over which operates the drive belt 33 which is in turn arranged to be driven between the sheave members 18 and 19 of the constant speed control unit shown in Fig. 2. The discharge from the compressor 31 passes out through the line 34 through the condenser 35 which is preferably arranged at a position in the motor vehicle that it is subjected to the suction air flow thereover provided by the main drive engine fan 36, such as being located in front of the regular radiator 37. Discharge from the condenser then passes through the line 38 through the expansion valve 39. Discharge from the expansion valve 39 enters the evaporator or cooling coil 40 which is mounted in the motor vehicle so as to receive return air 41 through the return air grill 42 upon operation of the cooling air circulating fans 43 and 44 driven respectively by the fan motors 45 and 46, air being discharged by these fans out through the discharge cool air ducts 47 and 48 through the discharge outlets 49 and 50 in the interior passenger compartment of the motor vehicle in a manner, for example, as shown in my co-pending patent application, Serial No. 313,260 filed October 6, 1952. Return from the evaporator or cooling coil 40 is by way of the line 51 back to the compressor 31.

Each of the fan motors 45 and 46 are individually controlled by selector rheostats. The motor 45 is energized from the battery 52 which is connected at its negative terminal, for example, to the ground line 53 the motor 45 being grounded through a suitable line 54 and 55 while the motor 46 is likewise grounded through the line 56. The positive side of the battery 52 is connected through a line 57, 58 and 59 to the control arms 60 and 61 of the respective control rheostats for the motors 45 and 46. Associated with the control arm 60 are the resistors 62 which in turn are connected through a line 63 of the motor 45 while the control arm 61 is selectably connectable to suitable resistors 64 which in turn are connected through lead 65 to the motor 46. By this arrangement manipulation of the control arms 60 and 61 may be had to vary the speed of either of the cool air circulating fans 43 and 44 to suit the occupants of the vehicle, the power for operating the motors 45 and 46 being derived from the electrical system and battery circuit of the motor vehicle.

In order to keep the battery 52 fully charged at all times and to relieve the battery of any work during the normal operation of the vehicle, there is provided the generator 66 which is grounded through a lead 67 and has its other lead 68 connected through the circuit breaker relay indicated generally at 69 which has an armature 70 actuated by the electromagnet 71 for opening and closing the contacts 72 and 73 in a well known conventional manner so as to disconnect the contacts 72—73, when the generator 66 is operating below its normal output range or when the main drive engine is stopped and the generator 66 is not operating so that the field windings in the generator will not discharge the battery 52.

The main drive engine is provided with the usual cooling system including the radiator 37 through which water is circulated by the water pump 74 which has inlet suction pipes 75 from the head of the engine 10 and a discharge pipe 76 emptying into the top of the radiator 37 and with a return pipe 77 connected in the bottom of the radiator returning it to the lower portion of the engine block 10. The radiator cooling fan 36 and the water pump 74 may preferably be driven from the common shaft 78 as in conventional practice by means of a suitable pulley 79 fixed thereto. The generator 66 may likewise be provided with a driven pulley 80 in a well known conventional manner. Both of the pulleys 79 and 80 are actuated by the drive belt 81 which belt is arranged to be driven between the first sheave element 17 and the intermediate sheave element 18 of the constant speed drive unit shown in Fig. 2.

While it is within the contemplation of this invention to utilize any form of constant speed drive between the crankshaft and the belts 33 and 81 either of mechanical, hydraulic, electrical or the like, for illustrative purposes there has been shown a simplified mechanical arrangement whereby variations in crankshaft speed 11 automatically maintain a constant output drive speed for the belts 33 and 81. There has thus been provided a unique overall drive mechanism for all of the essential elements to the proper operation of a refrigeration air conditioning system for an automobile. For instance, in the arrangement herein illustrated the refrigeration compressor 31 may be arranged to drive at its most efficient speed, for example, at a normal constant minimum speed of say 1800 R. P. M. for the compressor. Now with the arrangement shown, for example in Fig. 2, this constant minimum speed may be maintained for the compressor whether the engine is operating at idling speed or at the slower speed ranges in congested traffic or in winding road slow driving. As the crankshaft speed increases and the elements 18 and 19 move away from axially to the left, Fig. 2, the element 17 the belts 81 and 33 drop further down in the V surfaces 82 of the drive members 17, 18 and 19 so as to decrease the diameter of the pulley drive to the belts 33 and 81 and therefore reduce their peripheral speed, or rather maintain the feet per minute travel speed of the belts substantially constant. As a result, as soon as the operator starts the vehicle, the compressor 31 immediately starts up to a proper efficient constant minimum speed of operation. Accelerating the engine, however, does not over-race the compressor because the constant speed drive arrangement of Fig. 2 automatically compensates for this condition. Further, in driving in congested city traffic where a great deal of time is spent merely sitting and idling waiting for traffic lights and congestion to clear, the compressor is still operating at its constant minimum efficient speed. Thus, the car cooling from the compressor is maintained at a constant high level and therefore the vehicle is maintained at a comfortable cooling level at all times.

There is, however, more to the efficient operation of the system than merely keeping the compressor 31 operating at proper speed. One of the problems involved is the overload on the battery 52 by the fan motors 45 and 46 during idling and slow speed driving when the cutout relay 69 opens the contacts 72–73 as in all normal car operation. The result is that in city driving or at slow speed driving the battery 52 is soon run down because in order to have efficient circulation of the cooling air over the evaporator coil 40 high amperage load motors 45 and 46 are found to be necessary. By having the belt 81 operating at a constant minimum speed at all times for any motor speed, even at idling or low speed driving, the generator 66 is carrying the full load of the motors 45 and 46 and the battery 52 under these circumstances has been relegated to merely floating on the line under no load condition. Thus the air conditioning system can be utilized under all unfavorable city driving conditions without the fear of discharging the battery.

There are still other factors of great significance to the overall efficiency and successful operation of the refrigeration cooling under slow speed and idling conditions. One of the difficulties is boiling of the main drive engine under idling and slow speed driving conditions and this is particularly aggravated by the situation where the condenser heat from the condenser 35 is added to the normal radiator 37 of the motor vehicle. This can only be alleviated by forward movement of the vehicle at higher speeds in present drive arrangements for the compressor and accessories. No thought has been given to the problem of boiling when air conditioning systems are used under these unfavorable circumstances. In this arrangement, however, the water pump 74 operates at a constant minimum high level for rapid circulation of the coolant liquid through the engine and through the radiator 37 so that residual heat does not build up during slow speed and idling operation in the top of the heads in the motor and in the top of the radiator 37. Further, the circulating fan for the main radiator indicated at 36 also maintains a high level of circulation not only for the main drive radiator to prevent boiling of the main drive engine but also the all essential necessity of having a flow of air over the condenser 35. Without such circulation over the condenser 35 high speed continued operation of the compressor 31 will not result in efficient or satisfactory cooling by the refrigeration system. It is important to note that when the main drive motor is idling, its consumption of fuel is relatively small but its horse power capacity, so far as driving the accessories through the belt 81 and the refrigeration compressor 33, is so small in comparison to the overall horse power of the engine that very little heat is normally developed by the engine under these idling conditions, providing the water pump 74 and the main engine fan 36 operate at high speed to keep up their respective water and air circulations. It has been suggested that a high speed idling of the main drive engine would take care of the situation without using a constant speed drive to the compressor and engine accessories but, under these circumstances, the high use of fuel in the main drive engine to keep it rotating at high speed creates excessive heat in the engine and results in boiling.

Further, in modern automobiles with automatic transmissions it is essential that the main drive engine always idle at a predetermined slow speed for the proper and smooth functioning of the transmission. The automobile cannot start up without serious damage to the transmission if the engine itself is operating at a fast idle speed.

In certain instances it may be desirable to maintain a slow speed drive to the engine accessories and air conditioning compressor during the cranking or starting of the main drive engine 10 to prevent undue overload on the battery and starting motor. As illustrative of one arrangement to accomplish this result there is provided an armature pin 83 slidably mounted in the bore 84 formed in the stub end 12 of the crankshaft 11. A cross pin 85 is fixed in the armature pin 83 and extends radially outward through longitudinally extending slots 86 formed in the stub end 12 to rigidly engage the sliding third sheave member 19. A solenoid coil 87 is rigidly mounted on the cover guard 88 fixed to the bracket 89 by suitable bolts 90, and which bracket 89 in turn is secured to the engine 10 by the screws 91. Referring particularly to Fig. 1, whenever the starting switch 92 is pressed, electrical power from lead 58 and lead 93 is connected through lead 94 to the usual starting motor 95 of the main engine 10. At the same time that the starting switch 92 is pressed, power is connected from lead 94 to leads 95 and 96 to the solenoid coil 87 which is connected through lead 97 to ground. Thus energizing solenoid coil 87 causes armature pin 83 to move to the left, Fig. 2, to cause the belts 33 and 81 to then ride in the smaller diameters of the variable speed drive pulleys 17, 18, 19 for slow speed driving of the belts and to reduce starting drag on the battery and starting motor. As soon as the engine 10 starts up and the starting motor is de-energized by release of the starting switch and the breaking of the power supply lead 93 by the usual manifold vacuum operated switch (not shown) the solenoid 87 is again de-energized so that the constant speed control unit can again resume its regular operation recited above.

It is also contemplated to automatically render the constant speed drive mechanism for the accessories and air conditioner inoperative when the air conditioner is turned off and not in use, as when both cool air circulating fans 43 and 44 are completely stopped. In this arrangement each control arm 60 and 61 of the control rheostats for the cool air fan motors 45 and 46 are movable to completely off positions 60a and 61a, Fig. 1, to de-energize and stop the fans 43 and 44. When control arms 60 and 61 are moved to off position, switches 98 and 99 are operated to interconnect leads 58, 100, and 101 with lead 96 to thus energize solenoid coil 87 to move the constant speed control unit to normal fixed slow speed driving position for the accessories and air conditioning compressor to thus save wear on these units and unnecessary fuel consumption when the air conditioner is not being used.

Because of the added load presented to the main engine by the constant speed drive unit when the engine is operating at idling speed, means is provided to automatically adjust the idling setting of the carburetor for increased fuel whenever the constant speed drive unit is put into operation so that the main drive engine will not stall and will maintain the normal slow predetermined idling speed whether or not the air conditioner is being used. This arrangement comprises an idling control solenoid coil 101 having an armature 102 to which is fixed the dog 103 which is arranged to engage the dog 104 on the usual throttle push rod 105 for the carburetor 106. Whenever either or both of the control arms 60 and 61 are moved to a position to energize the cooling air fans 43 and 44, switches 98 and 99 interconnect lead 58 to lead 107 so as to energize idling control solenoid coil 101 to dog 103 to engage dog 104 to open the idling in the carburetor 106 to maintain correct idling speed for the engine 10 when the constant speed unit is cut in by switch 98 and 99 disconnecting lead 58 from lead 101 as described. It is to be understood that the stretch in the belts 33 and 81 or a conventional idler take-up may be utilized to maintain proper belt tension for any adjusted position of the constant speed drive pulley unit.

Figure 4:
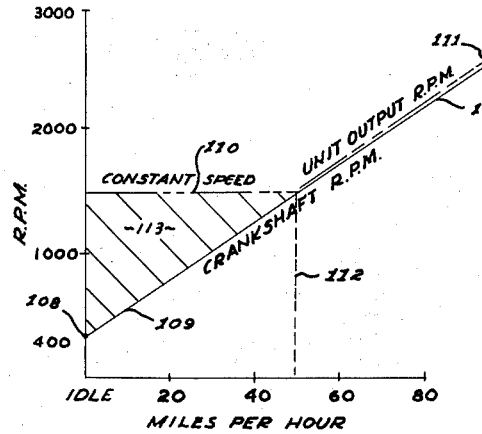
Fig. 4 is a diagram showing the relative speed of the engine crankshaft and the output of the constant speed drive unit.
Figure 3:
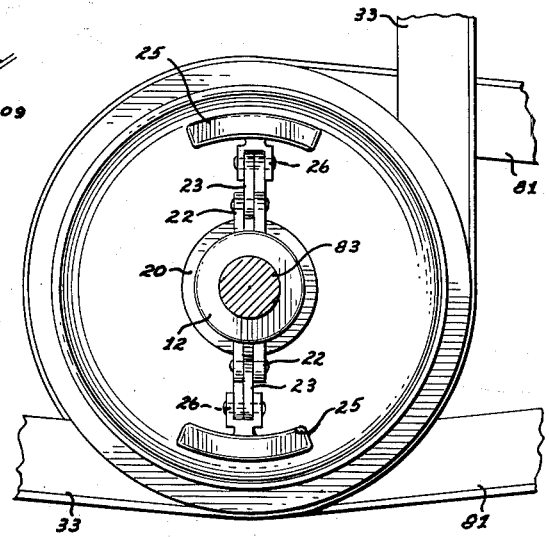
Fig. 3 is a section on the line 3—3 of Fig. 2.

Fig. 4 represents a preferred set of operating conditions of the above apparatus but it is to be understood the specific values for the speeds of the main drive engine and the constant speed drive unit may be changed to suit specific operating conditions without departing from the spirit of this invention. For exemplary purposes the main drive motor may have an idling speed of 400 R. P. M. and may go on up to over 3000 R. P. M. at the top speed of the vehicle. In the diagram, Fig. 14, the idling speed is shown at 108 and the line of speed increase of the main drive motor shown at 109. The output speed to the accessories and air conditioning compressor is shown by the line 110—111. It is to be noted that the line 110 is maintained at a predetermined constant speed equivalent to say 1500 R. P. M. for the main drive motor or a vehicle speed of 45 M. P. H. indicated at line 112. Thus the shaded area 113 of inefficiency and inoperativeness with direct variable speed drive from the crankshaft to the accessories and air conditioning compressor is completely eliminated. The accessories and compressor are never allowed to operate below a predetermined minimum constant speed 110, such as 1500 R. P. M. despite the fact the main drive engine is idling as shown at 108 at 400 R. P. M. or the vehicle is being driven slower than the speed shown at 112 or say 45 M. P. H. Above the minimum range 110 it is usually desirable and satisfactory to have the constant speed unit become a direct drive to the crankshaft so that from this point on up the compressor and accessories are driven in direct response to crankshaft speed.

Thus, what has been developed is the utilization of the main drive engine, despite its great variation from idling to high speed operation, to drive the air conditioning compressor and also the accessories at a constant minimum high efficient rate of speed irrespective of the idling or slow speed operation of the engine. Thus, not only is the air conditioning refrigeration compressor kept at its proper operating speed but the essential electrical power source for driving the cool air circulating fans is derived at all times from the generator and rather than from the battery during idling or slow speed driving. Further, the main air circulating fan for the engine radiator and also the air conditioning condenser is kept at a high level of air movement together with the water pump circulating the water for the main drive engine at a high rate despite the fact that the engine is operating at idling or very slow speed of operation. Thus, by this arrangement the high efficiency of air conditioning is maintained at all times in the apparatus and with a minimum of power consumption as the air conditioning compressor can be reduced in size by maintaining its constant efficiency from that of former devices. Further, the consumption of fuel of the main drive engine for rapid racing and idling of the engine is completely avoided while at the same time maintaining a high level of a driving efficiency for the air conditioning compressor and accessories of the main drive engine.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. An air conditioning apparatus for a motor vehicle having, a main drive engine, a crankshaft in said engine, a variable speed pulley mounted on and driven by said crankshaft, a main drive engine fan, a water pump, a generator, a belt connected between said variable speed pulley and said fan, pump, and generator, a refrigeration compressor, a belt connected between said variable speed pulley and said refrigeration compressor, a battery, a starting motor, a starting switch manually operable to connect said battery to energize said starting motor, means energized when said starting motor is energized to adjust said variable speed pulley, and further means responsive to the speed of said crankshaft to adjust said variable speed pulley.

2. An air conditioning apparatus for a motor vehicle having, a main drive engine, a crankshaft in said engine, a variable speed pulley mounted on and driven by said crankshaft, a main drive engine fan, a water pump, a generator, a belt connected between said variable speed pulley and said fan, pump, and generator, a refrigeration compressor, a belt connected between said variable speed pulley and said refrigeration compressor, a battery, a starting motor, a starting switch manually operable to connect said battery to energize said starting motor, means energized when said starting motor is energized to adjust said variable speed pulley, further means responsive to the speed of said crankshaft to adjust said variable speed pulley, a carburetor for said main drive engine, cooling air fan means including control switch gear for connecting or disconnecting said cooling air fan means to be energized from said battery and generator, and means energized when said cooling air fan means is energized to adjust said carburetor.

3. An automobile air conditioning apparatus including, a main drive internal combustion engine for propelling said automobile, a refrigeration compressor, a main drive engine radiator, a refrigeration condenser connected to said compressor, a main drive engine fan arranged to circulate air through said radiator and condenser, a generator, a battery connected to said generator, a cut-out relay interconnected between said battery and generator to disconnect said generator from said battery when said generator is operating below a predetermined reduced speed, an evaporator coil connected to said compressor, an expansion valve interconnected between said condenser and said evaporator coil, cooling air fan means energized from said battery and generator for circulating air in the passenger compartment of said automobile over said evaporator coil, means for electrically connecting said cooling air fan means to said battery and generator, a power output drive shaft from said main drive engine, and an automatically adjustable speed power transmission responsive to the speed of the main drive engine connected between said power output drive shaft and said compressor, pump, engine fan and generator to maintain a minimum constant speed for said accessories above the reduced speed of said generator at which said cut-out relay disconnects said battery from said generator.

4. In an automobile air conditioner including a main drive engine for propelling said vehicle, a water pump, a main drive engine fan, a generator, a refrigeration compressor, a crankshaft in said main drive engine having a stub end power take-off portion, an adjustable speed pulley mounted on said stub end, means responsive to variations in the speed of rotation of said crankshaft to automatically regulate said adjustable speed pulley to maintain a constant minimum predetermined driving speed for said belt means when the speed of rotation of said crankshaft is below a predetermined reduced value, said last mentioned means including, a first sheave member fixed to said stub end of said crankshaft, an intermediate sheave member rotatably driven by and axially slidable on said stub end, a third sheave member rotatably driven by and axially slidable on said stub end, a yoke bushing fixed on the outer portion of said stub end, bifurcated ears on the periphery of said yoke bushing, a first set of links pivotally mounted between said ears, fly balls fixed to the outer ends of said first links, a second set of links pivotally connected between the outer ends of said first links and said third sheave member, yielding means to normally swing said links toward said stub end portion of said crankshaft in opposition to the outward swinging of said links from centrifugal force by said fly balls, a belt connected between said first and intermediate sheave members and said compressor, and a second belt connected between said intermediate and third sheave and said pump, fan and generator to provide a balanced load drive at said adjustable speed pulley between said compressor and said engine accessories.

5. In an automobile air conditioner including a main drive engine for propelling said vehicle, a water pump, a main drive engine fan, a generator, a refrigeration compressor, a crankshaft in said main drive engine having a stub end power take-off portion, an adjustable speed pulley mounted on said stub end, means responsive to variations in the speed of rotation of said crankshaft to automatically regulate said adjustable speed pulley to maintain a constant minimum predetermined driving speed for said belt means when the speed of rotation of said crankshaft is below a predetermined reduced speed, said last mentioned means including, a first sheave member fixed to said stub end of said crankshaft, an intermediate sheave member rotatably driven by and axially slidable on said stub end, a third sheave member rotatably driven by and axially slidable on said stub end, a yoke bushing fixed on the outer portion of said stub end, bifurcated ears on the periphery of said yoke bushing, a first set of links pivotally mounted between said ears, fly balls fixed to the outer ends of said first links, a second set of links pivotally connected between the outer ends of said first links and said third sheave member, yielding means to normally swing said links toward said stub end portion of said crankshaft in opposition to the outward swinging of said links from centrifugal force by said fly balls, said yielding means comprising tension spring means interconnected between said yoke bushing and said second set of links, a belt connected between said first and intermediate sheave members and said compressor, and a second belt connected between said intermediate and third sheave and said pump, fan, and generator to provide a balanced load drive at said adjustable speed pulley between said compressor and said engine accessories.

6. In an automobile air conditioning apparatus including a main drive engine for propelling the vehicle, engine accessories, an air conditioning compressor, an adjustable speed drive unit connected between said engine and said accessories and compressor, a starting motor for said engine, a source of power for energizing said starting motor, and means responsive to the energization of said starting motor to adjust said adjustable speed unit to a low speed direct drive position from said crankshaft to said accessories and compressor.

7. In an automobile air conditioning apparatus including a main drive engine connected for propelling the vehicle, engine accessories, and an air conditioning compressor, an adjustable speed drive unit connected between said engine and said accessories and compressor, cooling air fan means for the passenger compartment of said automobile, manually operable control means for energizing or de-energizing said fan means, and means rendered operative by said control means, when adjusted to de-energize said cooling air fan means, to cause said adjustable speed control unit to maintain a low speed direct drive between said engine and said accessories and compressor.

8. In an automobile air conditioning apparatus including, a main drive engine for propelling the vehicle, engine accessories, and an air conditioning compressor, an adjustable speed drive unit connected between said engine and said accessories and compressor, cooling air fan means, control means for energizing or de-energizing said fan means, and means rendered operative by said control means, when adjusted to de-energize said cooling air fan means, to adjust said constant speed control unit to a low speed direct drive between said engine and said accessories and compressor, a carburetor, a throttle member connected to operate said carburetor, an actuating device connected to adjust the idling position of said throttle, and means for energizing said actuating device upon movement of said control means to energize said cooling air fan means.

9. In an automobile air conditioning apparatus including a main drive engine for propelling the vehicle, engine accessories, an air conditioning compressor, an adjustable speed drive unit connected between said engine and said accessories and compressor, constant speed drive unit adjusting means actuable to regulate said unit from its normal constant speed drive position to a fixed direct slow speed drive position, a carburetor for said engine, an idling adjusting means for said carburetor actuable to maintain a constant idling speed for said engine for any variation in load applied to said engine during idling operating conditions, and means for actuating said idling adjusting means to increase idling fuel supply in said carburetor whenever said constant speed drive unit adjusting means has regulated said adjustable speed drive unit for normal direct drive output to the accessories and compressor.

References Cited in the file of this patent
UNITED STATES PATENTS

| | | |
|---|---|---|
| 1,900,586 | Rippe | Mar. 7, 1933 |
| 2,173,661 | Perrine | Sept. 19, 1939 |
| 2,264,821 | Zukoski | Dec. 2, 1941 |
| 2,320,432 | Henny | June 1, 1943 |
| 2,346,017 | Errath | Apr. 4, 1944 |
| 2,677,251 | Clark | May 4, 1954 |